United States Patent
Hauet et al.

(10) Patent No.: US 8,163,405 B2
(45) Date of Patent: Apr. 24, 2012

(54) SYSTEM, METHOD AND APPARATUS FOR MULTIPLE ANISOTROPY LAYERED MAGNETIC STRUCTURES FOR CONTROLLING REVERSAL MECHANISM AND TIGHTENING OF SWITCHING FIELD DISTRIBUTION IN BIT PATTERNED MEDIA

(75) Inventors: Thomas Hauet, San Jose, CA (US);
Olav Hellwig, San Jose, CA (US);
Manfred Ernst Schabes, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 428 days.

(21) Appl. No.: 12/412,403

(22) Filed: Mar. 27, 2009

(65) Prior Publication Data
US 2010/0247969 A1 Sep. 30, 2010

(51) Int. Cl.
*G11B 5/66* (2006.01)
(52) U.S. Cl. ..................................... 428/828.1
(58) Field of Classification Search .................. None
See application file for complete search history.

(56) References Cited

U.S. PATENT DOCUMENTS

| | | | |
|---|---|---|---|
| 6,468,670 B1 | 10/2002 | Ikeda et al. | |
| 6,667,117 B2 | 12/2003 | Uwazumi et al. | |
| 6,881,497 B2 | 4/2005 | Coffey et al. | |
| 2004/0091748 A1 * | 5/2004 | Kamata et al. | 428/694 T |
| 2006/0177704 A1 | 8/2006 | Berger et al. | |
| 2007/0243418 A1 | 10/2007 | Fullerton et al. | |
| 2007/0281078 A1 * | 12/2007 | Kikitsu et al. | 427/127 |
| 2007/0292720 A1 | 12/2007 | Suess | |
| 2008/0070065 A1 * | 3/2008 | Berger et al. | 428/828.1 |
| 2008/0075845 A1 | 3/2008 | Sonobe et al. | |
| 2008/0084627 A1 | 4/2008 | Roshchin et al. | |
| 2008/0090104 A1 | 4/2008 | Sonobe et al. | |
| 2008/0180843 A1 | 7/2008 | Zhang et al. | |
| 2008/0199735 A1 | 8/2008 | Berger et al. | |

FOREIGN PATENT DOCUMENTS

| | | |
|---|---|---|
| JP | 11066532 | 3/1999 |
| JP | 2004062926 | 2/2004 |

OTHER PUBLICATIONS

Suess, D., et al., Exchange Spring Media for Perpendicular Recording, Applied Physics Letters 87, 012504 (2005).*
Lomakin, Vitaliy, et al., Dual-Layer Patterned Media "Ledge" Design for Ultrahigh Density Magnetic Recording, Applied Physics Letters 92, 022502 (2008).

(Continued)

*Primary Examiner* — Holly Rickman
*Assistant Examiner* — Lisa Chau

(57) ABSTRACT

Multiple anisotropy layered magnetic structures for controlling reversal mechanism and tightening of switching field distribution in bit patterned media are disclosed. The invention extends the exchange spring concept to more variable and sophisticated structures. Three or more layers with different anisotropy or anisotropy gradients increase writeability gains beyond the simple hard/soft bilayer exchange spring concept for BPM. The structures have a thin very hard, high anisotropy center layer that acts as a threshold or pinning layer for domain wall propagation through the entire media structure. In addition or alternatively, a thin very soft, low anisotropy center layer in between the commonly used soft surface layer and hard media layer allows quick initial propagation of the domain wall into the center of the media structure. Various properties of the media structures can be tuned more independently for optimization if using more advanced multi-anisotropy layer stacks.

12 Claims, 4 Drawing Sheets

OTHER PUBLICATIONS

Victora, R.H., et al, Exchange Coupled Composite Media, http://static.msi.umn.edu/general/reports/rptfiles/2007-182_46176.pdf.

Livshitz, B., et al., Fast Precessional Reversal in Perpendicular Composite Patterned Media, Journal of Applied Physics 103, 07C516 (2008).

Sues, D., et al., Exchange Spring Recording Media for Areal Densities Up to 10 Tbit/in2, Journal of Magnetism and Magnetic Materials 290-91 (2005) 551-54.

Thomson, T., et al., Intrinsic Distribution of Magnetic Anisotropy in Thin Films Probed by Patterned Nanostructures, Physical Review Letters, PRL 96, 257204 (2006).

Mangin, S., et al., Magnetic Relaxation in GdFe/TbFe/GdFe Trilayers: Dynamic Study of the Propagation of a 180° Domain Wall Through an Artificial Energy Barrier, Physical Review G, vol. 60, No. 2, Jul. 1999.

Sues, D., et al., Micromagnetic Modelling of Advanced Recording Structures, http://www.zid.tuwien.ac.at/projekte/2006/06-138-1.pdf.

Schabes, Manfred E., Micromagnetic Simulations for Terabit/in2 head/media systems, Journal of Magnetism and Magnetic Materials 320 (2008) 2880-2884.

Suess, D., Multilayer Exchange Spring Media for Magnetic Recording, Applied Physics Letters 89, 113105 (2006).

Goncharov, A., Recording Simulations on Graded Media for Area Densities of Up to 1 Tbit/in.2, Applied Physics Letters 91, 222502 (2007).

Hernandez, Stephanie, et al., Synthetic Antiferromagnet for Hard Layer of Exchange Coupled Composite Media, Applied Physics Letters 90, 132505 (2007).

Suess, D., et al., Thermal Stability of Graded Exchange Spring Media Under the Influence of External Fields, Applied Physics Letters 92, 173111 (2008).

* cited by examiner

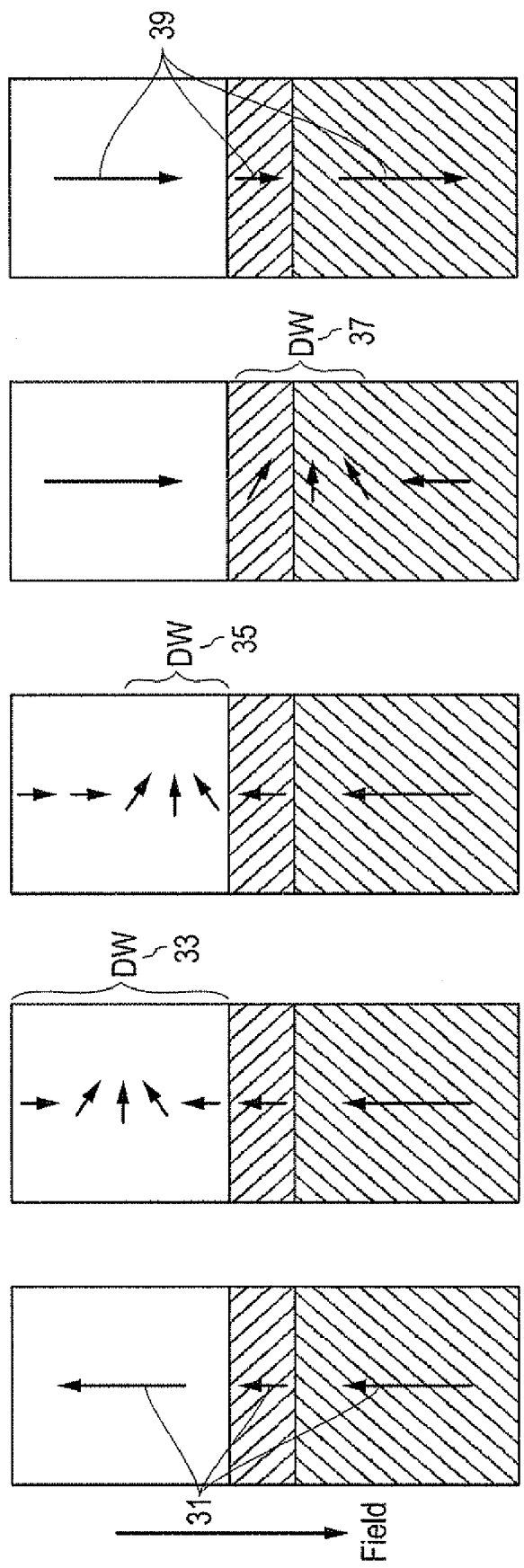

SYSTEM, METHOD AND APPARATUS FOR MULTIPLE ANISOTROPY LAYERED MAGNETIC STRUCTURES FOR CONTROLLING REVERSAL MECHANISM AND TIGHTENING OF SWITCHING FIELD DISTRIBUTION IN BIT PATTERNED MEDIA

BACKGROUND OF THE INVENTION

1. Technical Field

The present invention relates in general to magnetic hard disk drives and, in particular, to an improved system, method and apparatus with multiple anisotropy layered magnetic structures for controlling reversal mechanism and tightening of the magnetic switching field distribution in bit patterned media. Specific examples include three or more layers with different anisotropy origin, anisotropy direction or anisotropy gradients to further increase writeability gains in bit patterned media.

2. Description of the Related Art

Bit patterned media (BPM) is a leading candidate to extend the densities of magnetic recording beyond those achievable by conventional continuous perpendicular magnetic recording based on granular recording media. The islands of BPM need to be sufficiently small and of sufficient magnetic quality to support high bit areal densities (e.g., at 500 Gb/in$^2$ and beyond). For example at a density of 1 Tb/in$^2$, the islands have diameters that are approximately 15 to 20 nm (assuming a unit cell of 25.4 nm$^2$) with trenches having widths of about 10.4 to 15.4 nm, and bit aspect ratio (BAR) of about 1 or more. Moreover, we expect that the switching field distribution (SFD) needs to be smaller than 1000-1500 Oe, depending on the head field gradient and other system parameters. See, e.g., M. E. Schabes, "Micromagnetic Simulations for Terabit/in$^2$ Head/Media Systems," J. Magn. Mag. Mat., (2008). Furthermore, since the field of the write head becomes smaller as the size of the write head is decreased, maintaining the writeability and thermal stability of the islands is an issue for BPM at densities of 1 Tb/in$^2$ and beyond.

Another critical issue for the development of BPM is that the SFD (i.e., the bit-to-bit variation of the coercive field) needs to be narrow enough to secure exact addressability of individual predefined bits without overwriting adjacent bits. The SFD has many origins, such as variations in the patterned dot sizes, shapes and spacings, intrinsic magnetic anisotropy distribution of the magnetic thin film system used, and dipolar interactions between bits.

It also is known that exchange spring multilayer structures provide writeability gains for approximately fixed thermal barriers, and have thus been proposed for recording systems using continuous media and bit patterned media. See, e.g., D. Suess, et al., Appl. Phys. Lett. 87, 012504 (2005); D. Suess, Appl. Phys. Lett. 89, 113105 (2006); D. Suess, et al. J. Magn. Magn Mater. 290-291, 551 (2005); D. Suess, et al., Appl. Phys. Lett. 92, 173111 (2008). Multilayer exchange spring recording media comprising a hard magnetic storage layer strongly exchange coupled to a softer nucleation host have been proposed to decrease the switching field of the storage layer. This design keeps the energy barrier of the hard layer almost unchanged which allows maintaining a good thermal stability while lowering the reversal field. See, e.g., U.S. Pat. App. No. 2007/0292720, which is incorporated herein by reference in its entirety. In such a dual hard/soft layer structure, a vertical domain wall is nucleated at a low magnetic field in the softer layer. The vertical domain wall propagates through the soft layer and is pinned at the interface to the hard layer until the magnetic field amplitude is large enough to "propagate" the domain wall into the hard layer (i.e., the actual storage layer). In that case, the media switching field is defined as the domain wall depinning field. This field is lower than the media switching field itself, so that the exchange-spring structure allows decreasing of the media switching field. Moreover, the dependence of the depinning field as a function of the external field angle θ relative to the anisotropy axis is described by the Kondorsky-like law, $H_{switching}=1/\cos(\theta)$. In that case, $H_{switching}$ does not vary much as θ increases from 0 to 45 degrees, so that the exchange spring media allows reducing the SFD originating from an easy anisotropy axis angular distribution in the magnetic media.

In the present invention, novel structures of BPM islands are disclosed that enhance the gains of exchange spring materials for BPM, and thereby provide a solution for the aforementioned problems of BPM at areal densities in the range of about 0.5 to 10 Tb/in$^2$.

The local applied field required for propagating the vertical domain wall depends mainly on the properties of the media layer at the interface to the soft layer within a depth equal to the exchange length: $L(ex)=[A/(2\pi M_s^2)]^{1/2}$. This is about 20 nm for a Co/Pd multilayers, assuming an exchange constant $A=4\cdot10^{-6}$ erg/cm, and a saturation magnetization $M_s=400$ emu/Cm$^3$. This means that any intrinsic or extrinsic defect within the exchange length L(ex) inside the media layer induces a change (mostly an increase) in the propagation field value. In a real patterned dot array, the media layer is rarely uniform in depth and has a large intrinsic anisotropy variation from one bit to another. See, e.g., T. Thomson, et al., Phys. Rev. Lett. 96, 257204 (2006). Exchange-spring media structures still present large switching field distributions due to the large media volume that controls the propagation fields.

To solve at least part of this problem, one aspect of the present invention (beyond the introduction of more general, different anisotropy multilayer structures) is to reduce the magnetic volume that controls the domain wall pinning by adding a thin (high anisotropy) layer between the soft nucleation host layer and the actual media layer, acting as a potential barrier for the domain wall propagation. In that case the media layer is no longer the layer defining the domain wall pinning features and the properties of the pinning layer and actual storage layer can be tuned and optimized independently.

SUMMARY OF THE INVENTION

Embodiments of a system, method, and apparatus with multiple anisotropy layered magnetic structures for controlling reversal mechanism and tightening of the magnetic switching field distribution in bit patterned media are disclosed. The invention extends the exchange spring concept to more variable and sophisticated structures. Examples include three or more layers with different anisotropy amplitudes, origins, directions or gradients to increase writeability gains beyond the simple hard/soft bilayer exchange spring concept.

In some embodiments, structures have a thin very hard (i.e. high anisotropy) center layer that acts as a threshold or pinning layer for domain wall propagation through the entire media structure. In addition or alternatively, a thin very soft (i.e., low anisotropy) center layer in between the commonly used soft surface layer and hard media layer allows a large compression of the domain wall at the media interface. Gains are achieved in writeability and thermal stability beyond the bilayer exchange spring concept. Various properties of the media structures can be tuned more independently for optimization if using more advanced multi-anisotropy layer stacks.

Furthermore, the invention improves and better controls the reversal mechanism and therefore the switching field distribution (SFD) of conventional exchange-spring structures by introducing a propagation barrier. For example, the propagation barrier may comprise a thin very hard (or very soft or very soft/very hard) magnetic layer or multilayer (magnetic bilayer or magnetic gradient bilayer), between the nucleation host and the actual media layer. The thin intermediate layer or multilayer decreases the volume, which defines the propagation field value. Thus, the number of eventual defects influencing the propagation field is limited compared with those acting in the media layer (e.g., intrinsic anisotropy dispersions, intrinsic or extrinsic defects). As a consequence, adding the pinning layer reduces the SFD in bit patterned media.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more details a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

FIGS. 2A-E are schematic diagrams that illustrate the reversal mechanism in an embodiment of tri-layer exchange spring structures constructed in accordance with the invention;

DETAILED DESCRIPTION OF THE INVENTION

It is highly desirable to avoid the switching field of a bit-pattern media to be defined by the reversal process induced in the media itself. By coupling a soft magnetic layer (also know as a host nucleation layer) to the media, the switching process under an external magnetic field corresponds, first at low field, to the nucleation of a vertical domain wall into the soft layer that propagates through the soft layer and gets pinned at the soft/hard layer interface. Secondly, for a field $H_{(N,soft)} < H < H_{(N,media)}$, the switching proceeds via propagation of the domain wall into the media layer, thus inducing the actual storage media writing process. By adding additional layers with higher or lower anisotropy in between the conventional soft/media bi-layer exchange-spring structure, the gain in writeability is extended while maintaining thermal stability. This makes it possible to better control various media parameters that can be tuned independently and thus design a reversal mechanism that helps reducing the SFD in BPM. Specific anisotropy example profiles are outlined in more detail in the description of the drawings that follows.

Referring to FIGS. 1-4, embodiments of a system, method and apparatus with multiple anisotropy layered magnetic structures for controlling reversal mechanism and tightening of switching field distribution in bit patterned media are disclosed. In some embodiments, the invention comprises a structure for a tri-layer exchange spring. FIG. 1 depicts examples for tri-layer exchange spring structures with center domain wall propagation control layer and correspondingly tuned anisotropy profiles. The anisotropy within each sub-layer is approximately constant, FIG. 1A illustrates a tri-layer exchange spring with intermediate K1 of the mid-layer. FIG. 1B depicts a trilayer exchange spring with K1-dip 13. FIG. 1C illustrates a tri-layer exchange spring with K1-barrier 15. Depending on the actual media properties and microstructure, it may be advantageous to use either of these structures to tune the overall system parameters, such as coercivity (i.e. writeability), loop squareness, SFD, reversal mechanism and thermal stability towards the desired performance.

Figure 1A:
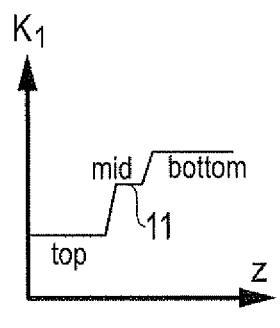
FIGS. 1A-E are schematic diagrams of various embodiments of tri-layer exchange spring structures constructed in accordance with the invention.
Figure 1B:
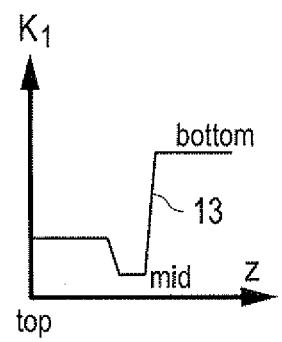
Figure 1C:
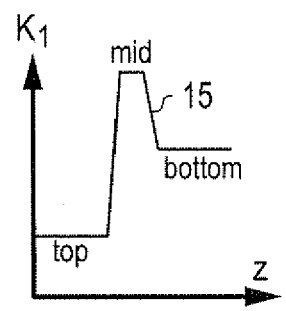
Figure 1D:
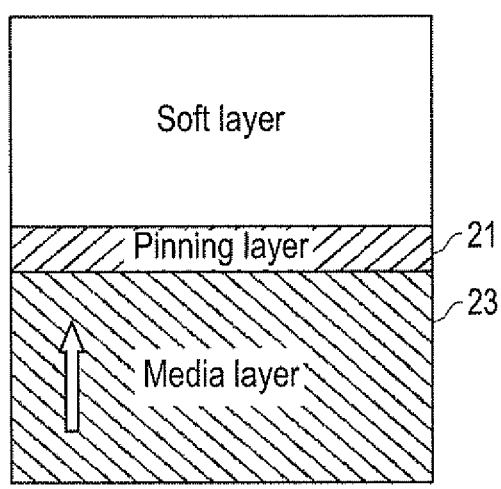
Figure 1E:
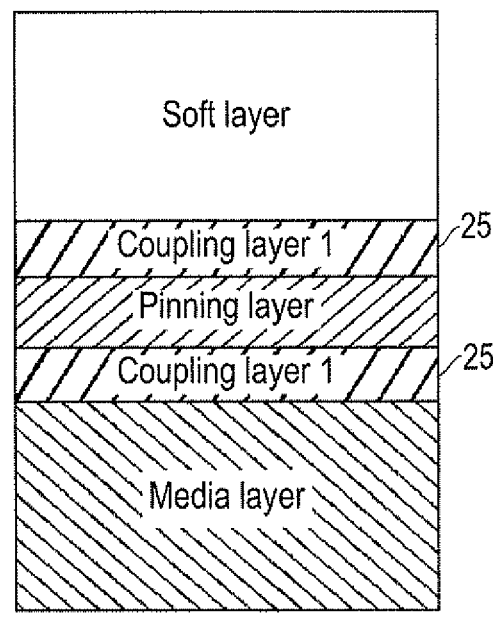

FIGS. 1D and 2 illustrate the anisotropy structure shown in FIG. 1C and its reversal as one more detailed example. The high anisotropy layer in the center acts as a pinning layer 21 for the domain wall. This allows rapid domain wall penetration through the media layer 23 once the threshold field of the pinning layer is overcome by the external field. In more detail, the magnetization configuration in this specific tri-layer stack is the following. For an applied field $H < H_{(N, soft)}$, the magnetizations 31 in the different layers are all aligned parallel (FIG. 2A). FIG. 1E depicts non-magnetic interlayers in between different anisotropy magnetic layers, in order to tune the exchange coupling between different anisotropy magnetic layers independently from the magnetic properties of the magnetic layers themselves. Usually the thickness of the non magnetic interlayer can be used to precisely tune the exchange coupling between the magnetic layers on either side.

In FIG. 2B, a domain wall 33 is nucleated into the soft layer. In FIG. 2C, for $H_{(N,soft)} < H < H_p$, the domain wall 35 is compressed against the pinning layer. In FIG. 2D, at $H = H_p$, the pining layer magnetization starts to reverse and the domain wall 37 is pushed through the pinning layer into the media layer. The domain wall is then pushed rapidly through the media layer since its anisotropy is lower than that of the pinning layer. Possible defects in the media layer are not able to pin the domain wall once it has propagated through the higher anisotropy pinning layer. In FIG. 2E, beyond $H_p$, all the magnetic layers, point along the external field direction 39 again.

FIG. 3 depicts other examples for tri-layer exchange spring structures with tuned anisotropy profiles. The anisotropy within at least one sub-layer is graded. FIG. 3A illustrates a tri-layer exchange spring with intermediate K1 of the mid-layer 41. FIG. 3B is a tri-layer exchange spring with K1-dip 43. FIG. 3C is a tri-layer exchange spring with K1 barrier 45, and FIG. 3D is a two-layer gradient structure 47.

Figure 4:
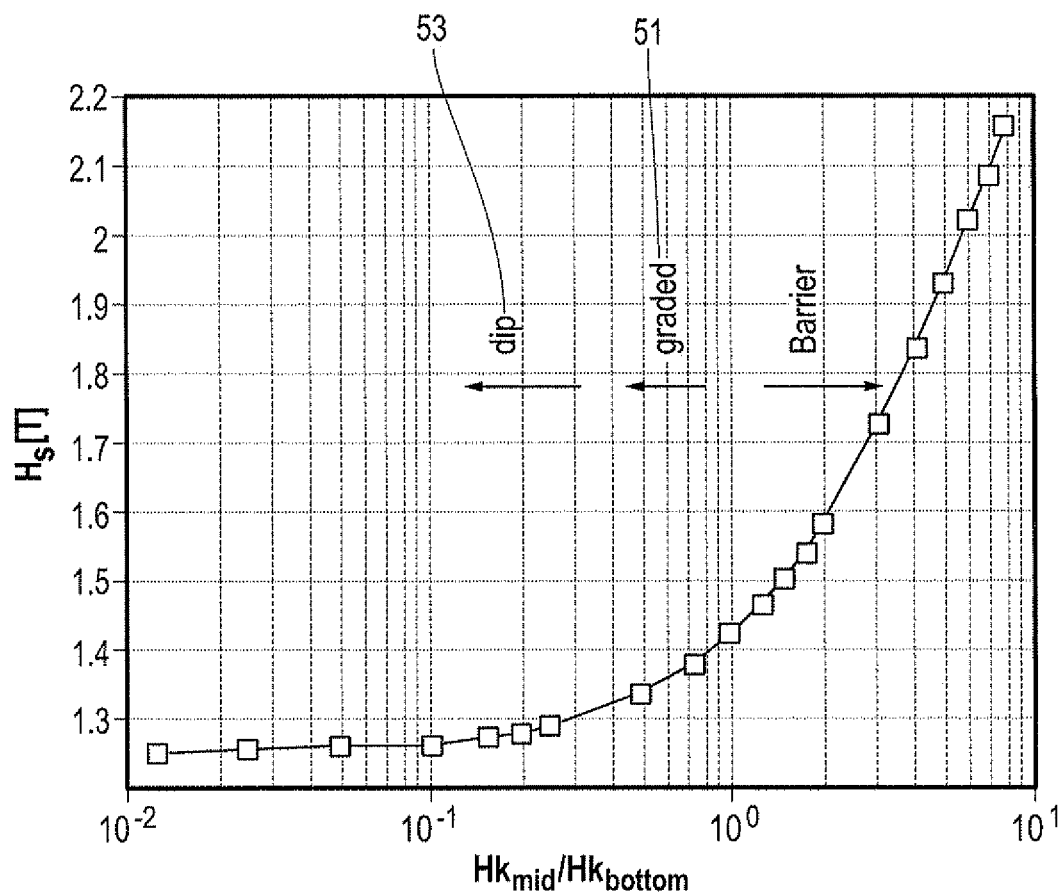
FIG. 4 is a plot of switching field as a function of mid-layer anisotropy for one embodiment of a structure constructed in accordance with the invention.

Improvement of the writeability and SFD will depend on many variables including, for example, material choice, defect densities, layer thicknesses, etc. A demonstration of benefits is depicted in FIG. 4 for exemplary embodiments of the invention using micromagnetic simulations of tri-layer structures. FIG. 4 depicts switching field as a function of mid layer anisotropy for an exemplary embodiment according to structures shown in FIGS. 1A-C. In this figure, the value of the switching field of the overall multilayer is depicted as a function of the ratio between the mid layer anisotropy field ($H_{K,mid}$) and the hard (bottom) layer anisotropy field ($H_{K,bottom}$). The switching field of the tri-layer structure can be decreased below the anisotropy of the graded structure 51 by using the mid-layer dip 53. Calculations of the SFD further show that the tri-layer structures have generally a significantly lower SFD as compared to the SFD of the hard storage layer (i.e., the bottom layer, in the examples above). For example, when the hard storage layer as a single-layer BPM had a SFD of 7.6% of $H_k$ in an example calculation, the tri-layer structures of FIG. 1 have SFD's in the range of 2.6-3.7% of $H_k$ for uncorrelated anisotropies of the sub-layers, and a SFD in the range of 4.5-5.7% of $H_k$ for correlated anisotropies.

Figure 3A:
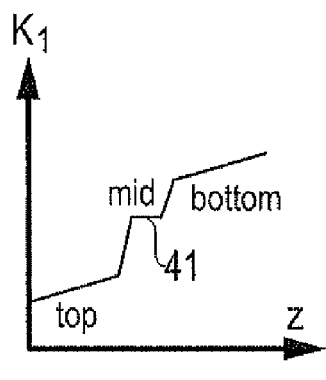
FIGS. 3A-D are schematic diagrams of still other embodiments of tri-layer exchange spring structures constructed in accordance with the invention.
Figure 3B:
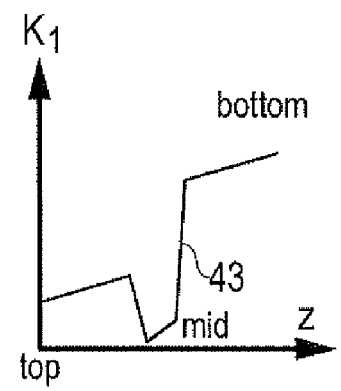
Figure 3C:
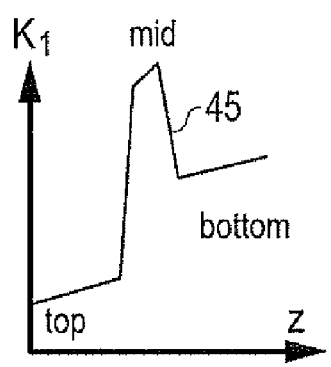
Figure 3D:
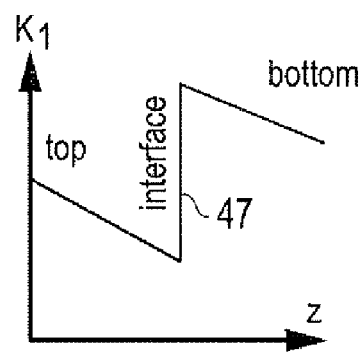

Some embodiments for materials that may be used for fabricating such a structure include the following. Using the anisotropy profile structures shown and described herein, perpendicular anisotropy materials, such as alloys ($Co_3Pt$, CoPt, FePt, CoCrPt, TbFeCo, TbCo, etc.) or multilayers (Co/Pt, Co/Pd, Co/Ni, Fe/Pd, Fe/Pt, etc.) may be used to allow for either constant anisotropy within one layer (FIG. 1C) or graded anisotropy within one layer (FIG. 3C). On this basis one could, for example, use a soft Co/Ni ML or CoCrPt alloy as the soft nucleation host layer, a very hard Co/Pd ML or $Co_3Pt$ or FePt layer as the threshold pinning layer and then an intermediate anisotropy Co/Pd or CoCrPt or $Co_3Pt$ layer as the actual storage layer. Here the specific anisotropies could be fine tuned via changing the individual layer thicknesses in the Co/Pd ML or the composition in the FePt or $Co_3Pt$ alloy layers.

In the embodiments of the tri-layer structure and its corresponding reversal mechanism represented in FIGS. 1D and 2, the hard magnetic media layer has a moderately high perpendicular anisotropy. The nucleation host layer consists of one or more ferromagnetic or ferromagnetic coupled layers. The anisotropy in the nucleation layer is smaller than that of the hard magnetic storage layer. In one embodiment, the pinning layer thickness is lower than the exchange length in the media and its anisotropy is higher than the media layer's anisotropy. The soft layer is coupled ferromagnetically to the pinning layer which itself is ferromagnetically coupled to the actual media layer.

A coupling layer may be introduced between the soft layer and intermediate layer as well as between the intermediate layer and media layer in order to tune and control the degree of exchange coupling between these layers. The coupling layer may consist of a single element or an alloy (e.g. Ru, Pd, Pt, RuCo, etc.).

With the new tri-component structure, the media magnetization switching may occur as following (FIG. 2). From a fully saturated state (FIG. 2A), at a field $H_N$, a vertical domain wall is nucleated in the soft layer (FIG. 2B). Between $H_N$ and $H_P$, the domain wall is compressed in the soft layer against the pinning layer in the center of the structure (FIG. 2C). At $H=H_P$, the domain wall overcomes the potential barrier (i.e., passes through the thin hard pinning layer in the center of the structure). The domain wall first reverses the pinning layer magnetization and then that of the media layer (FIG. 2D). For field amplitudes higher than $H_P$, the magnetizations of all the stack layers are uniformly pointing opposite to the initial state (FIG. 2E).

The characteristic properties of the propagation barrier (i.e., the zero field barrier height and the propagation field) are tunable by changing the pinning layer magnetic properties, such as anisotropy, saturation magnetization, thickness, microstructure, etc. See also S. Mangin, et al. Phys. Rev. B 60, 1204 (1999). The middle layer may be tuned to have a propagation field value, such that $H_{N(soft)} < H_P < H_{N(hard)}$, i.e., the field required to push to domain wall through the middle layer should be higher than the field required to nucleate a domain wall in the soft layer.

Inserting a pinning layer does not suppress the advantage of the regular exchange spring media structure of decreasing the absolute switching field, while conserving the thermal stability of the media layer. On the contrary, the pinning layer reinforces the zero field thermal stability of the media compared with the previous nucleation host/media bilayer structure.

In still other embodiments, the magnetic layers can have out-of-plane, in plane, or another direction of anisotropy and can be or not be collinear to each other. A soft layer/pinning layer bilayer structure may be used on both sides of the media layer. In that case, the system would be soft/pinning layer/media/pinning layer/soft layer. The coupling between the layers can be direct or indirect via an interlayer. The coupling can be ferromagnetic or anti-ferromagnetic.

Temperature may be used to activate the domain wall propagation through the very hard sandwiched layer. The domain wall overcoming the barrier is a thermally activated process, well known for improving the performance in thermally assisted recording.

In some embodiments, the invention is a multiple anisotropy layered magnetic structure for controlling reversal mechanism and tightening of switching field distribution (SFD) in bit patterned media. The invention may comprise an exchange spring having at least three layers with different anisotropy or anisotropy gradients for improving writeability gains; the exchange spring having: a soft surface layer; a hard media layer; and a propagation barrier comprising a thin very hard high anisotropy center layer between the soft surface layer and the hard media layer that acts as a threshold or pinning layer for the domain wall within the bit patterned media.

In other embodiments, the structure further comprises or alternatively comprises a thin, very soft, low anisotropy center layer in between the soft surface layer and the hard media layer to allow stabilizing the domain wall at the interface between the very soft layer and the media layer and to allow a larger compression of the domain wall before final propagation into the media layer. The soft surface layer may comprise a nucleation host, and the propagation barrier may comprise a magnetic layer or bilayer with constant anisotropy or graded anisotropy between the magnetic nucleation host and the hard media layer. The nucleation host may comprise one or more ferromagnetic or ferromagnetically coupled layers, with the anisotropy in the nucleation host being smaller than that of the hard media layer, and the thickness of the pinning layer being less than the exchange length in the media and its anisotropy higher than that of the hard media layer.

In still other embodiments, the propagation barrier decreases a critical propagation volume of the media layer in order to create a narrower SFD. In an external low magnetic field, the switching process may correspond to the nucleation of a vertical domain wall in the soft layer. For an external magnetic field $H_{(N,soft)} < H < H_{(N,media)}$, the switching process may correspond to the propagation of the domain wall inside the hard media layer, thus inducing the media writing process.

The invention may further comprise additional layers with anisotropies between those of the soft surface layer and the magnetic media layer, such that the gain in writeability is extended versus thermal stability. Moreover, the anisotropy within each sub-layer may be approximately constant. The anisotropy within at least one sub-layer may also be graded. The propagation barrier may provide one of (a) a dip in the anisotropy and (b) a barrier (peak) in the anisotropy. The soft surface layer may comprise Co/Ni, Co/Pd, Co/Pd ML, $Co_3Pd$, TbFeCo or CoCrPt alloy as a soft nucleation host layer, a very hard Co/Pd, Co/Pt ML or $Co_3Pt$, CoPt, FePt alloy layer as a threshold pinning layer, and an intermediate anisotropy Co/Pd, Co/Pt, CoCrPt, CoPt, FePt or $Co_3Pt$ layer as an actual storage layer. The magnetic layers also may have one of out-of-plane, in plane, or another direction of anisotropy and may be co-linear to each other.

While the invention has been shown or described in only some of its forms, it should be apparent to those skilled in the art that it is not so limited, but is susceptible to various changes without departing from the scope of the invention.

We claim:

1. A multiple anisotropy layered magnetic structure for controlling reversal mechanism and tightening of a magnetic switching field distribution (SFD) in bit patterned media, comprising:
   an exchange spring having at least three layers with different anisotropy or anisotropy gradients for improving writeability gains; the exchange spring having:
   a soft surface layer;
   a hard media layer;
   a propagation barrier comprising a high anisotropy center layer between the soft surface layer and the hard media layer that acts as a threshold or pinning layer for domain wall propagation through the bit patterned media; and
   the anisotropy of at least one of the soft surface layer, hard media layer and propagation barrier is graded.

2. A structure according to claim 1, further comprising a low anisotropy center layer in between the soft surface layer and the hard media layer to allow stabilizing the domain wall at the interface between the soft surface layer and the hard media layer and to allow a larger compression of the domain wall within the soft surface layer before propagation into the hard media layer.

3. A structure according to claim 1, wherein the soft surface layer is a nucleation host, and the propagation barrier comprises a magnetic layer or bilayer with constant anisotropy or graded anisotropy between the nucleation host and the hard media layer.

4. A structure according to claim 3, wherein the nucleation host comprises one or more ferromagnetic or ferromagnetically coupled layers, the anisotropy in the nucleation host is smaller than that of the hard media layer, and the thickness of the pinning layer is less than an exchange length in the bit patterned media and its anisotropy is higher than that of the hard media layer.

5. A structure according to claim 1, wherein the propagation barrier decreases a critical propagation volume of the hard media layer in order to create a narrower SFD, and the SFD is less than 1500 Oe.

6. A structure according to claim 1, wherein, in an external magnetic field, the switching process corresponds to nucleation of a vertical domain wall in the soft surface layer, and the propagation barrier provides a dip in the anisotropy.

7. A structure according to claim 1, wherein, for an external magnetic field $H_{(N,soft)}<H<H_{(N,media)}$, a switching process corresponds to the propagation of the domain wall inside the hard media layer, thus inducing the media writing process, and the propagation barrier provides a barrier (peak) in the anisotropy.

8. A structure according to claim 1, further comprising additional layers with anisotropies between those of the soft surface layer and the hard media layer, such that a gain in writeability is extended versus thermal stability.

9. A structure according to claim 1, wherein the anisotropy within each of the soft surface layer, hard media layer and the propagation barrier is graded.

10. A structure according to claim 9, wherein the propagation barrier provides a two-layer gradient structure in the anisotropy.

11. A structure according to claim 1, wherein the soft surface layer comprises Co/Ni, Co/Pd, Co/Pd, $Co_3Pd$, TbFeCo or CoCrPt alloy as a soft nucleation host layer, a hard Co/Pd, Co/Pt or $Co_3Pt$, CoPt, FePt alloy layer as a threshold pinning layer, and an intermediate anisotropy Co/Pd, Co/Pt, CoCrPt, Co/Pt, FePt or $Co_3Pt$ layer as hard media layer.

12. A structure according to claim 1, wherein the propagation barrier comprises a pinning layer located between two non-magnetic interlayers for tuning exchange coupling between different anisotropies independently from magnetic properties of the soft surface and hard media layers themselves.

* * * * *